Patented Feb. 15, 1949

2,461,807

UNITED STATES PATENT OFFICE 2,461,807

STABILIZATION OF FATTY MATERIALS

Loran O. Buxton, Maplewood, and Charles E. Dryden, East Orange, N. J., assignors to Nopco Chemical Company, Harrison, N. J., a corporation of New Jersey No Drawing. Application March 16, 1946, Serial No. 655,008

8 Claims. (Cl. 167—81)

The present invention relates to the stabilization of fatty materials. More particularly, the present invention relates to the preservation and stabilization of fatty materials such as fish liver oils or the like against oxidation.

In U. S. patent application Serial No. 568,075, filed December 13, 1944, now U. S. Patent No. 2,396,681, granted March 19, 1946 (a division of Serial No. 431,700, filed February 20, 1942, now U. S. Patent No. 2,396,680, granted March 19, 1946), there are disclosed antioxidant concentrates which can be prepared from various types of oils which are particularly applicable for the stabilization of fatty materials.

It has now been discovered that if antioxidants of the character described in the aforementioned patent are added to a fatty material and simultaneously, or thereafter, the mixture of fatty material and antioxidant is treated with ammonia, the antioxidant effect is greatly enhanced. Furthermore, the antioxidant concentrates can be treated with ammonia and thereafter the ammonia-treated concentrates can be added to fatty materials. In other words, the stabilized fatty material, after standing for a substantial time, will lose less of its vitamin value and will be less susceptible to oxidation if the material is combined with an antioxidant and then treated with ammonia, or if the antioxidant is treated with ammonia and thereafter added to the fatty material. It is believed that this is due to the formation in situ of new antioxidant substances both in the antioxidant concentrate and in the fatty material. In some instances these substances may be produced from components of the fatty material which, prior to ammonia treatment, have no antioxidant value. In addition to these antioxidants, new and better antioxidant components are believed to be produced from the antioxidant concentrate disclosed in the aforementioned application.

It is, therefore, one of the objects of the present invention to stabilize various types of fatty materials against oxidation.

A second object of the present invention is to stabilize the vitamin values of fatty materials containing the same, as, for example, fish liver oils, by the addition of an antioxidant concentrate to the fish liver oil and thereafter treating the same with ammonia.

A third object of the invention is to form new antioxidant concentrates by treating antioxidant concentrates with ammonia.

Other objects and advantages of the present invention will become apparent from the subsequent specification and claims.

The present invention can be applied to various types of fatty materials such as fatty oils, fats, waxes, soaps, vitamin concentrates, etc. Thus, oils and fats of animal, vegetable or fish origin, such as cod liver oil, as well as vitamin concentrates or vitamin-containing fractions obtained from such oils; corn oil, cottonseed oil, soybean oil, and other vegetable oils; fats such as butter, margarine, lard, hydrogenated shortenings, palm oil, etc.; soaps of higher fatty acids; and compositions containing such fatty materials as essential ingredients, as for example, cookies, cakes, crackers, breakfast cereals, etc., as well as food emulsions such as mayonnaise, may all be suitably stabilized in accordance with this invention. Furthermore, substances such as sulfonated oils and other sulfonated fatty compounds, amides, mono- and diglycerides and other fatty substances which tend to become rancid upon exposure to air may be treated in accordance with the present invention. Other materials subject to change upon oxidation which can be treated include cosmetics such as face creams, hand lotions, shaving creams, etc.; gasoline, mineral oil, lubricating oils, rubber, etc. The amount of the extract added to the material to be stabilized may vary considerably depending upon the activity of the extract and the degree of instability of the material to be stabilized. In general, from about 0.1% to about 20%, preferably from about 0.5% to about 5%, of antioxidant extract may be added to the oil or fat.

The present process is particularly applicable to the stabilization of fat-soluble vitamin-containing oils or concentrates as well as vitamin-containing fractions recoverable from such products by vacuum distillation, solvent extraction or other processes.

Substances of a fatty nature stabilized in accordance with the present invention can be heated to elevated temperatures without substantially affecting the activity of the antioxidants; moreover, the heating of vitamin-containing oils so stabilized does not substantially reduce the vitamin activity of the oils.

The present process is applicable to antioxidant concentrates which are produced by solvent extraction from crude vegetable oils and similar types of oils containing relatively large proportions of antioxidant. Thus, vegetable oils and fats such as soybean oil, wheat germ oil, corn germ oil, corn oil, oat oil, rye oil, olive oil, sesame oil, cottonseed oil, palm oil, cocoa butter, palm kernel oil, coconut oil, rice oil, rice germ oil, linseed oil, citicia oil, teaseed oil, perilla oil, alkalfa oil, celery seed oil, flax seed oil, groundnut oil, hempseed oil, kapok oil, mustard seed oil, rapeseed oil, poppy seed oil, sunflower seed oil, pumpkin seed oil, melon seed oil, peanut oil and the like can be treated. Another group of fatty materials which can be employed are the fish liver oils such as cod liver oil, tuna liver oil, halibut liver oil, shark liver oil, etc., as well as other marine oils such as menhaden oil, herring oil and sardine oil. Other oils which can be treated in accordance with my invention are tomato seed oil, grape seed oil, peach kernel oil, egg oil and whale oil. Preferably, the antioxidants are produced from vegetable oils.

The solvents which can be used in carrying out the process of the invention include methanol and ethanol, either of which may contain any suitable quantity of water or no water at all. Moreover, a mixture of these two solvents may be used. A solvent sold under the trade-mark "Solox" by U. S. Industrial Chemicals, Inc., was found to be quite efficacious in practicing this invention. The natural antioxidants which it is desired to extract from the fatty materials are soluble in methanol and ethanol at room temperature (10° C. to 30° C.) whereas the fatty materials themselves are immiscible therewith or relatively so.

In carrying out the extraction of the antioxidants from the oils with which they are associated, the oil to be treated is first mixed with the particular solvent to be employed. The relative proportion of oil to solvent may vary widely; the ratio of solvent to oil should be greater than one and, preferably, two to fifty parts of solvent to one part of oil. If desired, the solvent-oil mass may be warmed to a temperature slightly or substantially above room temperature. By so doing it is sometimes possible to obtain somewhat more intimate contact of the solvent with the fatty material and thereby obtain a more efficient and complete extraction of the natural antioxidants. The solvent solution and the fatty material can then be separated from each other at the elevated temperature or the mixture can first be allowed to cool to room temperature before completing this step of the process. The extraction is preferably carried out in an atmosphere of inert gas.

The antioxidant fraction extracted from the oil may be recovered in any suitable manner. As the solvent and the oil are immiscible at room or at temperatures substantially above room temperature, they can be separated by decantation, centrifugation or any other suitable means. The oil will generally be found to be somewhat lighter in color than originally and in many cases will have lost some of its original characteristic odor. Furthermore, in most cases it will be found that materials responsible for producing "break" have been removed from the oil by the extraction. Thus the oil which has been extracted by the process of this invention can be used for a wide variety of purposes in accordance with processes well known to the art.

The solvent solution can be filtered and then treated to remove the solvent therefrom, e. g., by vacuum distillation, whereby an extract is recovered containing relatively large amounts of highly active antioxidants. If desired, water may be added to the extract in order to precipitate some of the glycerides contained therein or some of the sterols may be removed; however, these steps are not essential since the glycerides and sterols do not inhibit the antioxidant properties of the extract. If the extract contains an excessive amount of free fatty acids, these are preferably removed by treatment with alkali in a hydrocarbon or chlorinated hydrocarbon solvent medium or by other suitable methods. The extract ordinarily possesses the characteristic odor and color of the oil from which it is obtained and is generally slightly more viscous than the original oil. Tests carried out on vegetable oil extracts indicate that the iodine values of the extracts are substantially lower than those of the original oils. If a vitamin-containing fish liver oil is employed in the practice of the present invention, it will be found that the extract contains a considerable portion of the vitamins concentrated therein.

Preferably, the fish liver oil and the like, having an antioxidant concentrate of the character previously set forth added thereto, is treated with ammonia in the presence of a suitable solvent for the fish liver oil. Similarly, when an antioxidant concentrate is first treated with ammonia, a suitable solvent is preferably used. The solvent employed in the practice of this invention should be one in which the fatty material to be stabilized is readily soluble and/or the antioxidant concentrate is at least partially soluble. Thus, if a fish liver oil or concentrate prepared therefrom is being treated, a hydrocarbon or halogenated hydrocarbon solvent such as hexane, heptane, octane, ethylene dichloride, trichloroethylene, carbon tetrachloride, cyclohexane, methyl cyclohexane or benzene may be employed as the solvent, as well as solvents such as acetone, diacetone alcohol and the like. Further, mixtures of the above solvents may also be used. Thus a mixture of equal parts of acetone and methanol has been found especially suitable.

The amount of solvent employed should be at least equivalent to and, in some instances, in excess of the amount of material being treated. The amount of ammonia used in the process is relatively small as compared to the quantity of fatty material or fish liver oil being treated and may vary from about 1% to 20% by weight of concentrated aqueous ammonia as compared to the weight of the fatty material. When gaseous ammonia or liquid ammonia is used, the amount is equivalent to that quantity of concentrated aqueous ammonia above set forth. It is to be understood that liquid or gaseous ammonia may be used in the present process. It is desired to point out, therefore, that when in the specification and claims the term "ammonia" is used, liquid or gaseous ammonia and ammonia dissolved in water or other suitable solvent therefor is intended. In general, the quantity of antioxidant concentrate which is added to the fish liver oil and the like is relatively small, being in the neighborhood of 2%, although in some instances from 0.1% to 20% may be used. Preferably, however, from 0.5% to about 5% of antioxidant concentrate is sufficient to greatly enhance the stability of fatty materials of the character set forth.

It may be noted that where the antioxidant concentrate or extract is treated with ammonia before being added to the fatty material to be stabilized, the amount of ammonia used is equivalent to that just set forth, i. e., approximately equal to and in some instances considerably less than the weight of the concentrate.

The following examples are intended to illustrate the invention without in any way limiting the same:

Example I 500 grams of crude expeller soybean oil were admixed with 2000 ml. of synthetic methanol and the mixture warmed to 50° C. in the presence of nitrogen gas. The mass after reaching 50° C. was agitated and then cooled to room temperature after which the solvent solution of the extracted material was separated from the oil. The oil was again extracted in the manner set forth above and the two extracts combined and freed of methanol under reduced pressure in the presence of gaseous nitrogen. The yield of antioxidant extract was 23.5 grams.

25 grams of a carbon-refined shark liver oil having a potency of 56,400 U. S. P. units of vitamin A per gram and containing .75 gram of the extract recovered above were dissolved in 100 cc. of acetone. 5 cc. of concentrated (28%) ammonium hydroxide were added to the acetone solution and the mass was refluxed for three hours. The acetone, ammonia and water were then removed from the mass by distillation under reduced pressure.

Example II

The same procedure as that set forth in Example I was carried out with the exception that the use of acetone was dispensed with. The shark liver oil containing the methanol extract was heated at 50° to 55° C. for three hours using a long reflux condenser to prevent the escape of ammonia.

The stabilized products produced according to Examples I and II were compared with a blank of the same carbon-refined shark liver oil and a second blank of the same oil containing 3% of the methanol extract per se, produced according to the first half of Example I, by pouring 20 grams of each oil in a separate 100 cc. beaker and storing these samples at 36 C. in a dark oven. The vitamin A potency in each sample was measured at intervals as revealed in the following table:

Table

| Sample | | Per cent Loss of Vitamin A after— | | |
|---|---|---|---|---|
| | | 6 days | 14 days | 20 days |
| 1 | Carbon-refined shark liver oil contg. 56,400 A/gm | 51.0 | | |
| 2 | Sample 1 containing 3% methanol extract | 12.2 | 28.6 | 45.5 |
| 3 | Product of Example I | 6.6 | 14.0 | 26.6 |
| 4 | Product of Example II | 1.5 | 10.6 | 25.0 |

It will be noted that the process may also be practiced by first treating an antioxidant concentrate of the character set forth with a small amount of ammonia in the presence of a solvent in which the antioxidant concentrate is at least partially soluble. Thereafter the so activated antioxidant concentrate may be added to the fatty material prone to oxidation.

This application is a continuation-in-part of our application Serial No. 528,353 filed March 27, 1944, now Patent No. 2,434,790.

Having described our invention, what we claim as new and desire to secure by Letters Patent is:

1. A process for producing an antioxidant for stabilizing fatty materials which comprises contacting a crude fatty material containing natural antioxidants with a solvent selected from the group consisting of methanol and ethanol, separating a solution containing a highly active antioxidant extract from the remainder of the fatty material, recovering the antioxidant extract from the solvent solution thereof and contacting said extract with ammonia to increase its antioxidant activity.

2. The process of claim 1 wherein the antioxidant extract is contacted with ammonia while dissolved in a fat solvent.

3. A process for stabilizing a fatty material prone to oxidation which comprises adding to the fatty material an antioxidant extract—produced by contacting a crude fatty material containing natural antioxidants with a solvent selected from the group consisting of methanol and ethanol, separating a solution containing a highly active antioxidant extract from the remainder of the fatty material and recovering the antioxidant extract from the solvent solution thereof—and contacting said fatty material containing said added antioxidant extract with ammonia to increase the antioxidant activity of said extract.

4. The process of claim 3 wherein the fatty material containing the antioxidant extract is contacted with ammonia while dissolved in a fat solvent.

5. The process of claim 3 wherein the fatty material containing the antioxidant extract is contacted with ammonia while dissolved in acetone.

6. A process for stabilizing a fatty material containing a fat-soluble vitamin which comprises adding to the fatty material an antioxidant extract—produced by contacting a crude fatty material containing natural antioxidants with a solvent selected from the group consisting of methanol and ethanol, separating a solution containing a highly active antioxidant extract from the remainder of the fatty material and recovering the antioxidant extract from the solvent solution thereof—and contacting said fatty material containing said added antioxidant extract with ammonia to increase the antioxidant activity of said extract.

7. The process of claim 6 wherein the fatty material containing the antioxidant extract is contacted with ammonia while dissolved in a fat solvent.

8. The process of claim 6 wherein the fatty material containing the antioxidant extract is contacted with ammonia while dissolved in acetone.

LORAN O. BUXTON.
CHARLES E. DRYDEN.

REFERENCES CITED

The following references are of record in the file of this patent:

UNITED STATES PATENTS

| Number | Name | Date |
|---|---|---|
| 1,616,292 | Wilhelm | Feb. 1, 1927 |
| 1,729,809 | Wilhelm | Oct. 1, 1929 |
| 2,396,681 | Buxton | Mar. 19, 1946 |